United States Patent
Tseng et al.

(10) Patent No.: US 10,971,132 B2
(45) Date of Patent: Apr. 6, 2021

(54) MULTIMEDIA PROCESSING METHOD AND ELECTRONIC SYSTEM

(71) Applicant: ACER INCORPORATED, New Taipei (TW)

(72) Inventors: Gianna Tseng, New Taipei (TW); Szu-Ting Chou, New Taipei (TW); Shang-Yao Lin, New Taipei (TW); Shih-Cheng Huang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 74 days.

(21) Appl. No.: 16/430,407

(22) Filed: Jun. 3, 2019

(65) Prior Publication Data

US 2020/0074980 A1 Mar. 5, 2020

Related U.S. Application Data

(63) Continuation-in-part of application No. 16/200,556, filed on Nov. 26, 2018, now Pat. No. 10,706,855.

(30) Foreign Application Priority Data

Aug. 28, 2018 (TW) .................... 10712991.2
Apr. 15, 2019 (TW) .................... 10811307.3

(51) Int. Cl.
*G06F 17/27* (2006.01)
*G10L 13/027* (2013.01)
(Continued)

(52) U.S. Cl.
CPC .......... *G10L 13/027* (2013.01); *G06F 40/242* (2020.01); *G06F 40/58* (2020.01); *G10L 15/26* (2013.01)

(58) Field of Classification Search
CPC ... G10L 15/26; G10L 15/22; G10L 2015/223; G10L 13/00; G10L 15/005;
(Continued)

(56) References Cited

U.S. PATENT DOCUMENTS 6,006,175 A  12/1999 Holzrichter
8,566,078 B2 10/2013 Sarikaya
(Continued)

FOREIGN PATENT DOCUMENTS

CN  104303177 A  1/2015
CN  105393302 A  3/2016
(Continued)

*Primary Examiner* — Vijay B Chawan
(74) *Attorney, Agent, or Firm* — Winston Hsu

(57) ABSTRACT

An electronic system is provided. The electronic system includes a host, an audio output device and a display. The host includes an audio processing module, a relay processing module, a smart interpreter engine and a driver. The audio processing module is utilized for acquiring audio data corresponding to a first language from audio streams processed by an application program executed on the host. The smart interpreter engine is utilized for converting the audio data corresponding to the first language into text data corresponding to a second language. The relay processing module is utilized for transmitting the text data corresponding to the second language to the display for displaying. The driver is utilized for converting the data corresponding to the first language into an analog audio signal corresponding to the first language and transmitting the analog audio signal corresponding to the first language to the audio output device for playback.

20 Claims, 10 Drawing Sheets

(51) Int. Cl.
*G10L 15/26* (2006.01)
*G06F 40/58* (2020.01)
*G06F 40/242* (2020.01)

(58) Field of Classification Search
CPC ..... G10L 15/1815; G10L 15/30; G10L 13/02;
G10L 13/08; G10L 13/086; G10L 15/16;
G10L 15/1822; G10L 15/20; G10L 17/00;
G10L 17/02; G10L 17/18; G10L 21/0208;
G10L 21/06; G06F 40/58; G06F 40/242;
G06F 3/167; G06F 16/3344; G06F 40/30
USPC ........ 704/9, 257, 275, 270.1, 3, 2, 270, 260,
704/231
See application file for complete search history.

(56) References Cited

U.S. PATENT DOCUMENTS

| | | | | |
|---|---|---|---|---|
| 8,825,468 | B2* | 9/2014 | Jacobsen | G06F 40/58 |
| | | | | 704/3 |
| 9,794,613 | B2 | 10/2017 | Jang | |
| 10,009,645 | B2 | 6/2018 | Jang | |
| 10,417,349 | B2* | 9/2019 | Lewis | G06F 40/58 |
| 10,706,855 | B2* | 7/2020 | Tseng | G10L 15/16 |
| 2009/0099836 | A1* | 4/2009 | Jacobsen | G06F 40/58 |
| | | | | 704/3 |
| 2013/0024197 | A1 | 1/2013 | Jang | |
| 2013/0073293 | A1* | 3/2013 | Jang | G10L 15/22 |
| | | | | 704/275 |
| 2013/0289971 | A1* | 10/2013 | Parkinson | G06F 40/58 |
| | | | | 704/2 |
| 2014/0147816 | A1* | 5/2014 | Ferro | G09B 5/065 |
| | | | | 434/157 |
| 2014/0324422 | A1* | 10/2014 | Winarski | H04L 65/4076 |
| | | | | 704/235 |
| 2016/0162477 | A1 | 6/2016 | Orsini | |
| 2018/0286400 | A1* | 10/2018 | Seo | G10L 15/22 |
| 2018/0293220 | A1 | 10/2018 | Lee | |
| 2018/0315427 | A1* | 11/2018 | Kwon | G06F 3/167 |
| 2018/0374482 | A1* | 12/2018 | Woo | G10L 15/22 |
| 2019/0340190 | A1* | 11/2019 | Ganteaume | G06F 9/5072 |
| 2019/0354592 | A1* | 11/2019 | Musham | G06F 40/58 |

FOREIGN PATENT DOCUMENTS

| | | |
|---|---|---|
| CN | 105531758 A | 4/2016 |
| TW | 201346597 A | 11/2013 |
| TW | M553001 U | 12/2017 |
| TW | M563122 U | 7/2018 |

* cited by examiner

MULTIMEDIA PROCESSING METHOD AND ELECTRONIC SYSTEM

CROSS REFERENCE TO RELATED APPLICATIONS

This application is a continuation-in-part U.S. application Ser. No. 16/200,556, filed on Nov. 26, 2018. The contents of these applications are incorporated herein by reference.

BACKGROUND OF THE INVENTION

1. Field of the Invention

The present invention relates to an electronic system and multimedia processing method, and more particularly, to an electronic system and multimedia processing method capable of acquiring audio data in game and submitting audio data to a smart interpreter engine for vocal identification and neural machine translation, and thus improving the user experience.

2. Description of the Prior Art

With development of technology and improvement of people's living standard, people are more closely connected with to computer systems. People frequently use computer systems whether they are at home or at work. Recently, computer systems play an important role in video game industry. For example, a gaming computer is designed for playing games. A good interaction between players in the same team is very important. However, the poor communication or communication difficulty may easy occur between players who using different languages, and thus resulting in poor records. Thus, the prior art has to be improved.

SUMMARY OF THE INVENTION

It is therefore a primary objective of the present invention to provide an electronic system and multimedia processing method capable of improving the user experience, to solve the above-mentioned problem.

According to an embodiment of the present invention, an exemplary electronic system is disclosed. The exemplary electronic system comprises a host, comprising: an audio processing module for acquiring audio data corresponding to a first language from audio streams processed by an application program executed on the host; a relay processing module, for receiving the audio data corresponding to the first language from the audio processing module; a smart interpreter engine for receiving the audio data corresponding to the first language from the relay processing module and converting the audio data corresponding to the first language into text data corresponding to a second language, wherein the smart interpreter engine transmits the text data corresponding to the second language to the relay processing module; and a driver for converting the audio data corresponding to the first language into an analog speech signal corresponding to the first language; an audio output device for playing the analog speech signal corresponding to the first language; and a display for receiving the text data corresponding to the second language from the relay processing module and displaying the text data corresponding to the second language.

According to an embodiment of the present invention, an exemplary multimedia processing method for an electronic system is disclosed. The electronic system comprises a host, the host comprising an audio processing module, a relay processing module, a smart interpreter engine and a driver, the multimedia processing method comprises utilizing the audio processing module to acquire audio data corresponding to a first language from audio streams processed by an application program executed on the host and transmitting the audio data corresponding to the first language to the relay processing module and the driver; utilizing the relay processing module to transmit the audio data corresponding to the first language to the smart interpreter engine; utilizing the smart interpreter engine to convert the audio data corresponding to the first language into text data corresponding to a second language and transmit the text data corresponding to the second language to the relay processing module; utilizing the relay processing module to transmit the text data corresponding to the second language to a display of the electronic system for displaying; and utilizing the driver to convert the audio data corresponding to the first language into an analog speech signal corresponding to the first language and output the analog speech signal corresponding to the first language to an audio output device of the electronic system for playing.

According to an embodiment of the present invention, an exemplary electronic system is disclosed. The exemplary electronic system comprises an audio input device for acquiring speech sounds of current environment to generate an analog speech signal corresponding to a first language; and a host, comprising: a driver for receiving the analog speech signal corresponding to the first language from the audio input device and converting the analog speech signal corresponding to the first language into audio data corresponding to the first language; an audio processing module for obtaining the audio data corresponding to the first language from the driver; a relay processing module for receiving the audio data corresponding to the first language from the audio processing module; and a smart interpreter engine for receiving the audio data corresponding to the first language from the relay processing module and converting the audio data corresponding to the first language into audio data corresponding to a second language; wherein the relay processing module receives the audio data corresponding to the second language from the smart interpreter engine and transmits the audio data corresponding to the second language to the audio processing module and the audio processing module transmits the audio data corresponding to the second language to an application program executed by the host.

According to an embodiment of the present invention, an exemplary multimedia processing method is disclosed. The electronic system comprises an audio input device and a host, the host comprising an audio processing module, a relay processing module, a smart interpreter engine and a driver. The exemplary multimedia processing method comprises utilizing the audio input device to acquire speech sounds of current environment to generate an analog speech signal corresponding to a first language; utilizing the driver to receive the analog speech signal corresponding to the first language from the audio input device and convert the analog speech signal corresponding to the first language into audio data corresponding to the first language; utilizing the audio processing module to obtain the audio data corresponding to the first language from the driver; utilizing the audio processing module to transmit the audio data corresponding to the first language to the smart interpreter engine; utilizing the smart interpreter engine to convert the audio data corresponding to the first language into audio data corresponding to a second language and transmit the audio data corresponding to the second language to the relay processing module; utilizing the relay processing module to transmit the audio data corresponding to the second language to the audio processing module; and utilizing the audio processing module to transmit the audio data corresponding to the second language to an application program executed by the host.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
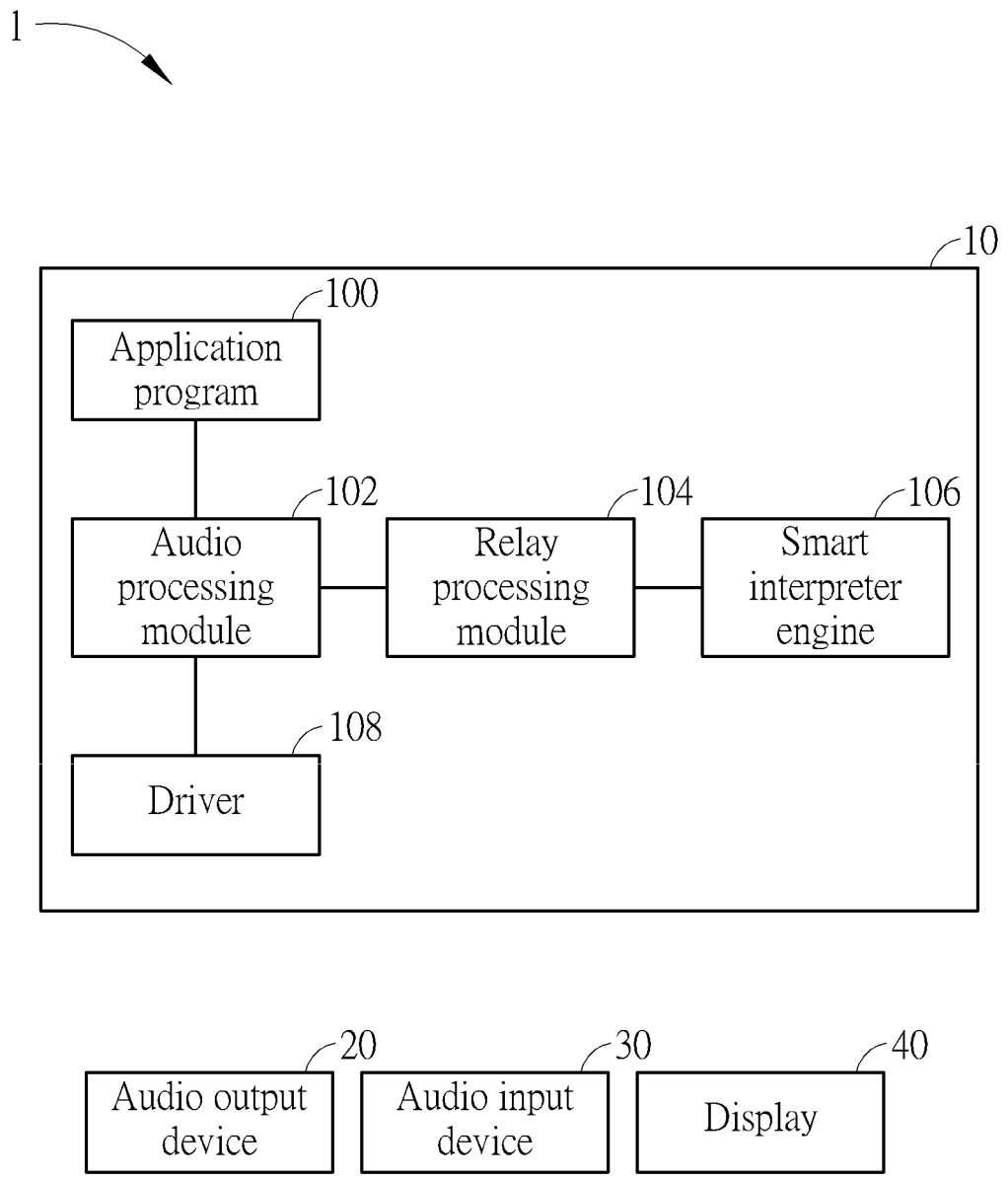
FIG. 1 is a schematic diagram illustrating an electronic system according to an embodiment of the present invention.

Please refer to FIG. 1, which is a schematic diagram illustrating an electronic system 1 according to an embodiment of the present invention. The electronic system 1 includes a host 10, an audio output device 20, an audio input device 30 and a display 40. The host 10 can be a desktop computer, a notebook, a mobile communication device, but not limited thereto. The host 10 includes an application program 100, an audio processing module 102, a relay processing module 104, a smart interpreter engine 106 and a driver 108. The application program 100 is stored in a storage device (not shown in figures) of the host 10 and executed by a processing circuit (not shown in figures) of the host 10. The application program 100 is configured to process audio streams. The audio streams correspond to a first language. Audio data of the audio streams may be classified into a plurality of audio (sound) categories. The audio processing module 102 can acquire at least one sound type of audio data (or speech data) from the audio streams processed by the application program 100 as audio data corresponding to a first language. The audio processing module 102 can transmit the acquired audio data corresponding to the first language to the relay processing module 104. The relay processing module 104 transmits the audio data corresponding to the first language to the smart interpreter engine 106 for processing. Moreover, the audio processing module 102 can transmit the acquired audio data corresponding to the first language to the driver 108. The driver 108 can convert the audio data acquired by the audio processing module 102 and corresponding to the first language into an analog speech signal corresponding to the first language. The driver 108 can transmit the analog speech signal corresponding to the first language to the audio output device 20. For example, the driver 108 transmits the speech data corresponding to the first language to the audio output device 20 through a transmission interface (e.g., universal serial bus (USB) interface).

The audio output device 20 is utilized for playing the analog speech signal corresponding to the first language. The audio output device 20 can be a headphone or a speaker, but not limited thereto. The audio input device 30 is utilized for acquiring speech sounds in the current environment to generate an analog speech signal corresponding to a first language. The audio input device 30 can be a microphone, but not limited thereto. The audio output device 20, the audio input device 30 and the display 40 can be connected to the host 10 through wireless or wired connections. In addition, the audio output device 20 and the audio input device 30 may be integrated onto a single structural element, such as a headset product.

The audio input device 30 can transmit the acquired analog speech signal corresponding to the first language to the driver 108. The driver 18 can convert the analog speech signal acquired by the audio input device 30 and corresponding to the first language into audio data corresponding to the first language into audio data corresponding to the first language. The driver 18 can transmit the audio data corresponding to the first language to the audio processing module 102. When receiving the audio data corresponding to the first language from the driver 108, the audio processing module 102 transmits the audio data corresponding to the first language to the relay processing module 104. When receiving the audio data corresponding to the first language from the audio processing module 102, the relay processing module 104 transmits the audio data corresponding to the smart interpreter engine 106.

Figure 2:
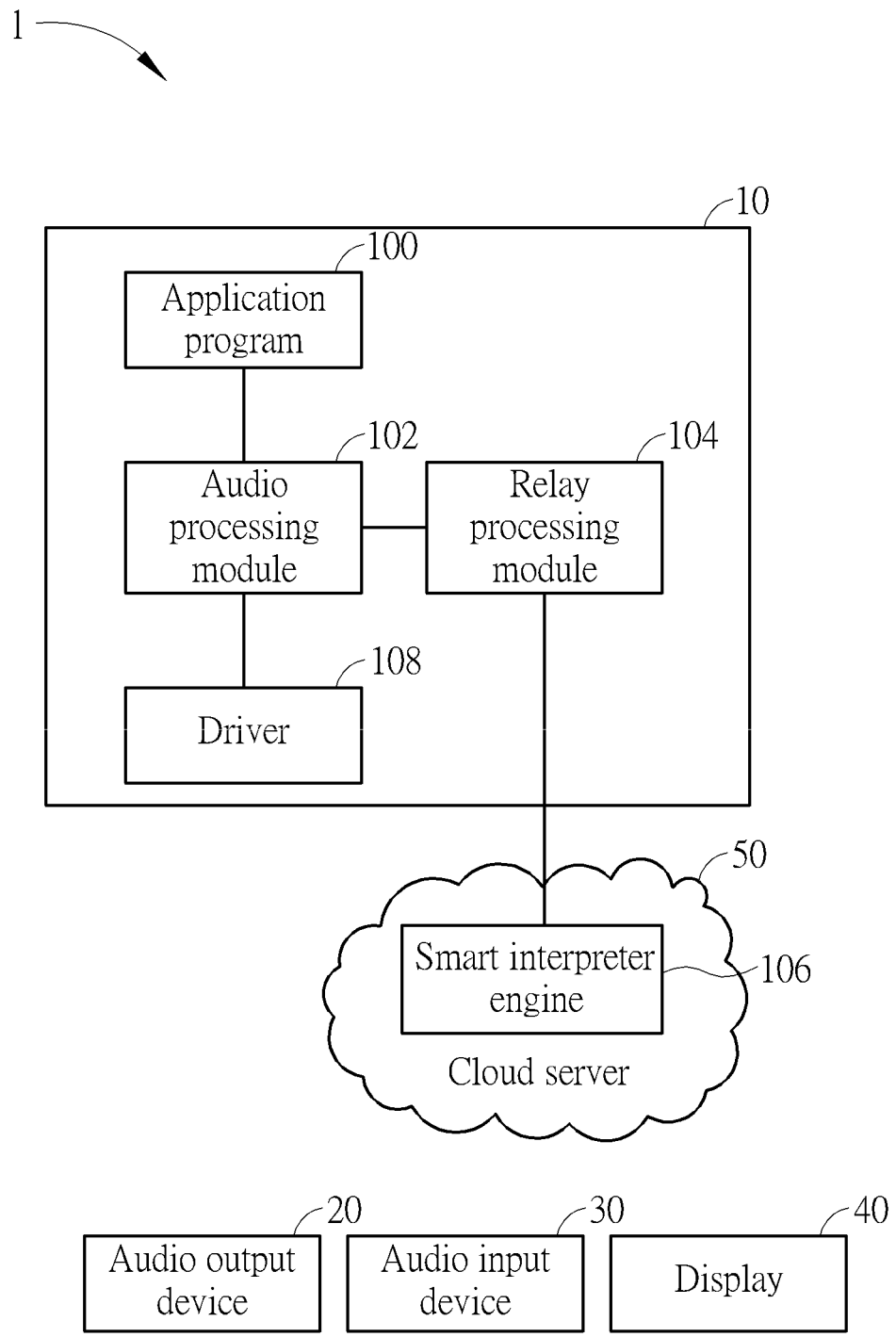
FIG. 2 is a schematic diagram of the smart interpreter engine shown in FIG. 1 according to a first exemplary embodiment of the invention.

The smart interpreter engine 106 can convert the audio data corresponding to the first language into text data corresponding to a second language. The smart interpreter engine 106 can further convert the text data corresponding to the second language into audio data corresponding to the second language. The smart interpreter engine 106 can be integrated into the relay processing module 104. The smart interpreter engine 106 can also be disposed in a cloud device for processing data transmitted by the relay processing module 104. For example, please refer to FIG. 2, which is a schematic diagram illustrating the smart interpreter engine 106 according to an alternative embodiment of the present invention. As shown in FIG. 2, the smart interpreter engine 106 is disposed in a cloud server 50, such that the relay processing module 104 can communicate with the smart interpreter engine 106 through a wired or wireless network for transmitting related data.

Figure 3:
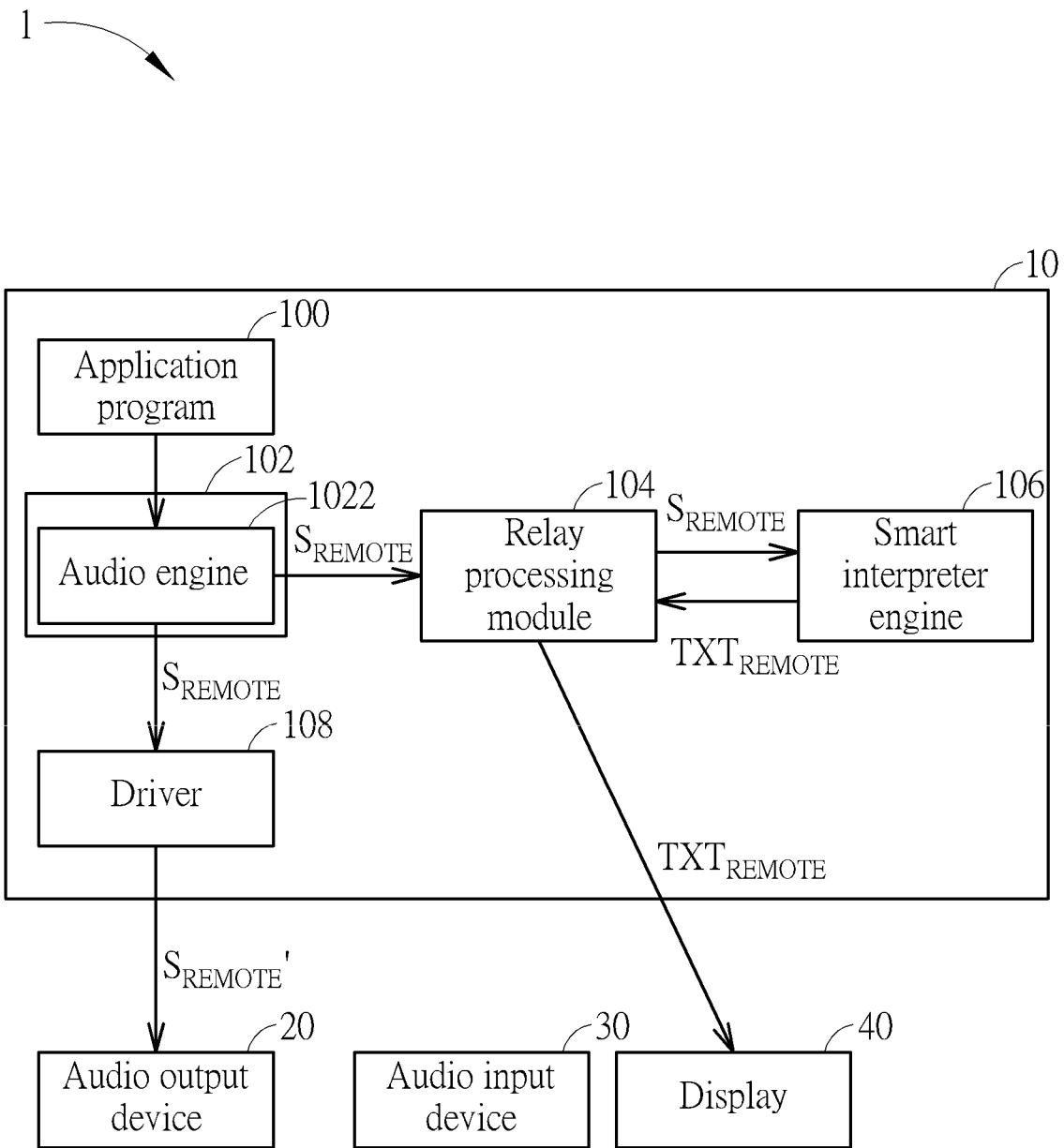
FIG. 3 is a schematic diagram of the electronic system operating in a first operation mode according to a first exemplary embodiment of the invention.

Please refer to FIG. 3. FIG. 3 is a schematic diagram of the electronic system 1 operating in a first operation mode (rendering mode) according to a first exemplary embodiment of the invention. As shown in FIG. 3, the audio processing module 102 includes an audio engine 1022. For example, the audio engine 1022 can be an audio processing object (APO). In the first operation mode (rendering mode), the audio engine 1022 of the audio processing module 102 can acquire a first sound type of audio data from audio streams processed by the application program 100 for acting as audio data $S_{REMOTE}$ corresponding to a first language. For example, audio (sound) category of Microsoft Windows 10 operating system includes at least the following: movie, media, game chat, speech, communications, alerts, sound effects, game media, game effect, others. Each audio data can be tagged with one of sound categories. The audio engine 1022 can acquire at least one sound type of audio data from audio streams processed by the application program 100 for acting as audio data $S_{REMOTE}$ corresponding to a first language. In an embodiment, the audio engine 1022 acquires all of the audio data tagged as "Game chat" from the audio streams processed by the application program 100 for acting as the audio data $S_{REMOTE}$ corresponding to the first language according to the audio category tagged with the audio data. In an alternative embodiment, the audio engine 1022 acquires all of the audio data tagged as any of "Game chat", "communications" and "others" from the audio streams processed by the application program 100 for acting as the audio data $S_{REMOTE}$ corresponding to the first language according to the audio category tagged with the audio data.

For example, please further refer to FIG. 1 and FIG. 3. If the application program 100 is game software. The audio engine 1022 includes a stream effect (SFX) APO. As shown in Table 1, the SFX APO can receive audio (sound) data of game from the application program 100 for sound effect processing. For example, the SFX APO can obtain audio data tagged as "game chat" (e.g., player vocal shown in Table 1) for sound effect processing. Before sound effect processing, the SFX APO can copy the audio data tagged as "game chat", and the copied audio data is utilized as the audio data $S_{REMOTE}$ corresponding to the first language. In other words, the audio engine 1022 can utilize the APO to acquire the required sound types of audio data from the audio streams. In more detail, the audio engine 1022 merely acquires the required sound types of audio data from the audio streams without further processing the acquired audio data.

TABLE 1

| Sound data in game | Background Music (BGM) | Partial sound effect (Punch sound, collision sound . . . etc.) | NPC Sound | Game environment sound | Player vocal (for communication, live broadcast) |
|---|---|---|---|---|---|
| Audio Stream Category Of Windows 10 operating system | In Game Music | Game Effect | Game Effect | Game Effect | Game Chat |

Moreover, the audio engine 1022 transmits the audio data $S_{REMOTE}$ corresponding to the first language to the relay processing module 104 and the driver 108. The relay processing module 104 transmits the audio data $S_{REMOTE}$ corresponding to the first language to the smart interpreter engine 106. The smart interpreter engine 106 converts the audio data $S_{REMOTE}$ corresponding to the first language into text data $TXT_{REMOTE}$ corresponding to a second language and provides the text data $TXT_{REMOTE}$ corresponding to the second language to the delay processing module 104. After that, the delay processing module 104 provides the text data $TXT_{REMOTE}$ corresponding to the second language to the display 40. The display 40 displays the text data $TXT_{REMOTE}$ corresponding to the second language for the user. Further, since the audio data $S_{REMOTE}$ corresponding to the first language is a digital signal, the driver 108 converts the audio data $S_{REMOTE}$ corresponding to the first language into an analog speech signal $S_{REMOTE'}$ corresponding to the first language. The analog speech signal $S_{REMOTE'}$ corresponding to the first language is an analog signal. For example, the driver 108 includes a digital to analog converter (not shown in figures). The digital to analog converter can convert the audio data $S_{REMOTE}$ corresponding to the first language into an analog speech signal $S_{REMOTE'}$ corresponding to the first language. The driver 108 transmits the analog speech signal $S_{REMOTE'}$ corresponding to the first language to the audio output device 20. The audio output device 20 playbacks the analog speech signal $S_{REMOTE'}$ corresponding to the first language to generate sound to the user.

For example, if the first language is English and the second language is Chinese. After acquiring the audio data $S_{REMOTE}$ in English, the audio processing module 102 provides the audio data $S_{REMOTE}$ in English to the smart interpreter engine 106 through the delay processing module 104. The smart interpreter engine 106 converts the audio data $S_{REMOTE}$ in English into text data $TXT_{REMOTE}$ in Chinese, such that the display 40 displays the text data TXT$_{REMOTE}$ in Chinese. Meanwhile, the driver 108 converts the audio data S$_{REMOTE}$ in English into an analog speech signal S$_{REMOTE'}$ in English and transmits the analog speech signal S$_{REMOTE'}$ in English to the audio output device 20 for playback. Therefore, when a user familiar with the second language is using the electronic system 1, the user can hear the analog speech signal S$_{REMOTE'}$ corresponding to the first language played by the audio output device 20 and see the text data TXT$_{REMOTE}$ corresponding to the second language displayed by the display 40. Under such a situation, even the user does not understand the analog speech signal S$_{REMOTE'}$ corresponding to the first language, the user can understand and perceive what the information conveyed by the audio data S$_{REMOTE}$ corresponding to the first language while seeing the text data TXT$_{REMOTE}$ corresponding to the second language displayed by the display 40.

Figure 4:
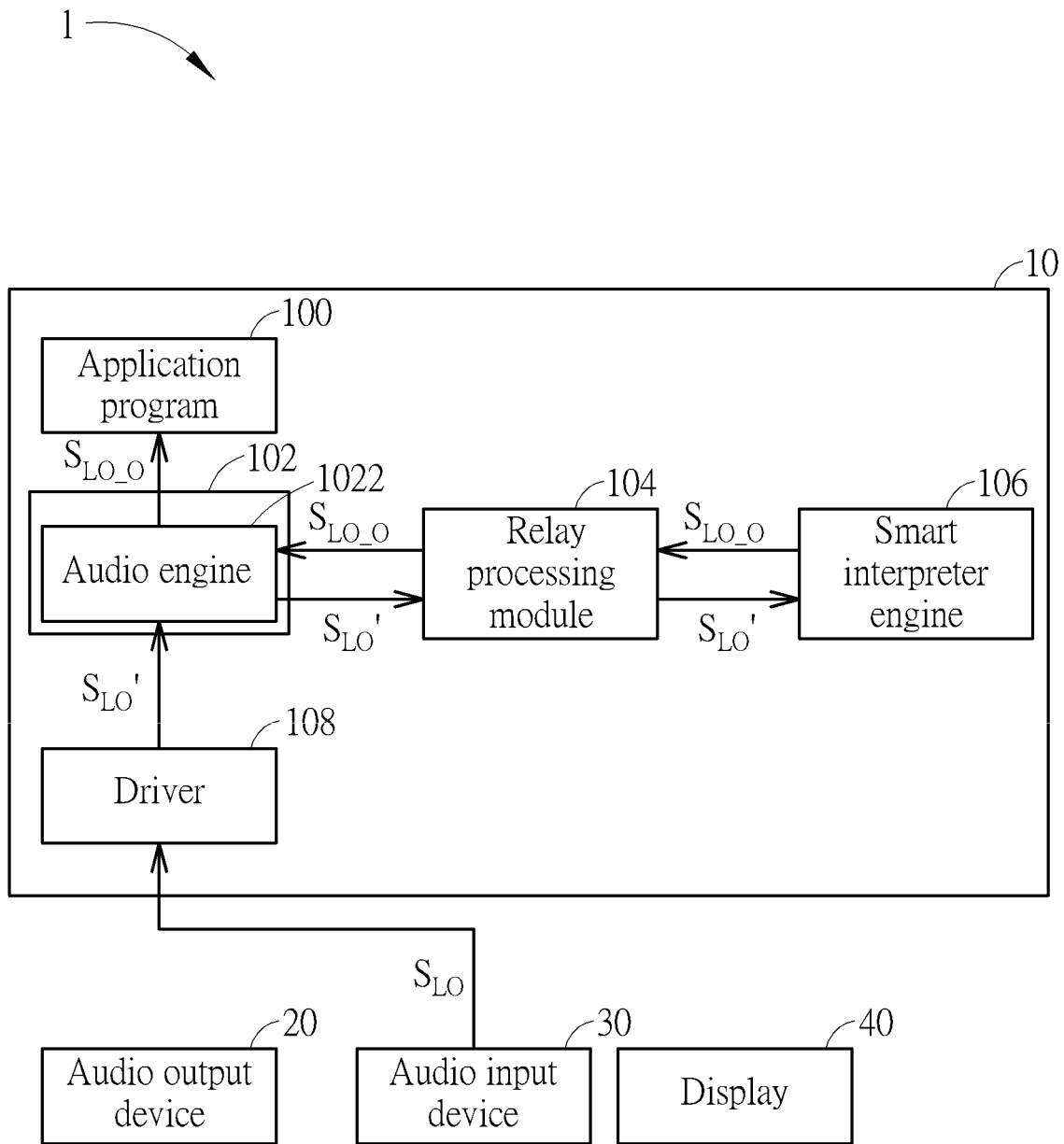
FIG. 4 is a schematic diagram of the electronic system operating in a second operation mode according to a first exemplary embodiment of the invention.

Please refer to FIG. 4. FIG. 4 is a schematic diagram of the electronic system 1 operating in a second operation mode (capturing mode) according to a first exemplary embodiment of the invention. As shown in FIG. 4, the audio processing module 102 includes an audio engine 1022. For example, the audio engine 1022 can be an APO. In the second operation mode (capturing mode), the audio input device 30 acquires speech sounds of the current environment to generate an analog speech signal S$_{LO}$ corresponding to a first language. The audio input device 30 transmits the analog speech signal S$_{LO}$ corresponding to the first language to the driver 108. Since the analog speech signal S$_{LO}$ corresponding to the first language is an analog signal, the driver 108 converts the analog speech signal S$_{LO}$ corresponding to the first language into audio data S$_{LO'}$ corresponding to the first language. The audio data S$_{LO'}$ corresponding to the first language is a digital signal. For example, the driver 108 includes an analog to digital converter (not shown in figures). The analog to digital converter can convert the analog speech signal S$_{LO}$ corresponding to the first language into the audio data S$_{LO'}$ corresponding to the first language. The driver 108 transmits the audio data S$_{LO'}$ corresponding to the first language to the audio engine 1022. The audio engine 1022 transmits the audio data S$_{LO'}$ corresponding to the first language to the relay processing module 104. The relay processing module 104 transmits the audio data S$_{LO'}$ corresponding to the first language to the smart interpreter engine 106.

The smart interpreter engine 106 converts the audio data S$_{LO'}$ corresponding to the first language into audio data S$_{LO\_O}$ corresponding to a second language. In an embodiment, the smart interpreter engine 106 converts the audio data S$_{LO'}$ corresponding to the first language into text data corresponding to the first language and further converts the text data corresponding to the first language into text data corresponding to the second language. Further, the smart interpreter engine 106 converts the text data corresponding to the second language into audio data S$_{LO\_O}$ corresponding to the second language. In an alternative embodiment, the smart interpreter engine 106 converts the audio data S$_{LO'}$ corresponding to the first language into text data corresponding to the second language and further converts the text data corresponding to the second language into audio data S$_{LO\_O}$ corresponding to the second language. Moreover, the smart interpreter engine 106 transmits the audio data S$_{LO\_O}$ corresponding to the second language to the relay processing module 104. The relay processing module 104 transmits the audio data S$_{LO\_O}$ corresponding to the second language to the audio engine 1022. The audio engine 1022 provides the audio data S$_{LO\_O}$ corresponding to the second language to the application program 100. The application program 100 provides the audio data S$_{LO\_O}$ corresponding to the second language to the external device. As a result, when a user familiar with the second language is using the external device, the user can understand and perceive the information conveyed by the user of the electronic system 1 when hearing the audio data S$_{LO\_O}$ corresponding to the second language outputted by the electronic system 1.

In other words, when the electronic system 1 operates in a first operation mode (rendering mode), the audio processing module 102 transmits the audio data S$_{REMOTE}$ corresponding to the first language, which is acquired from the audio streams, to the relay processing module 104. When the electronic system 1 operates in a second operation mode (capturing mode), the audio processing module 102 transmits the audio data S$_{LO'}$ corresponding to the first language, which is converted by the driver 108, to the relay processing module 104. Moreover, the relay processing module 104 receives and provides the audio data S$_{LO\_O}$ corresponding to the second language to the application program 100. Since the relay processing module 104 is disposed in the host 10, the audio data S$_{REMOTE}$ corresponding to the first language and the audio data S$_{LO'}$ converted by the driver and corresponding to the first language can be transmitted to the relay processing module 104 by the audio processing module 102, without being transmitted through the driver 108. In addition, during the first operation mode (rendering mode), the relay processing module 104 transmits the audio data S$_{REMOTE}$ corresponding to the first language to the smart interpreter engine 106 and transmits the text data TXT$_{REMOTE}$ corresponding to the second language to the display 40 for display. During the second operation mode (capturing mode), the relay processing module 104 transmits the audio data S$_{LO'}$ corresponding to the first language to the smart interpreter engine 106 and transmits audio data S$_{LO\_O}$ to the audio processing module 102. Therefore, the relay processing module 104 can coordinate and arrange the input and output of the smart interpreter engine 106 for realizing related data conversion process.

Figure 5:
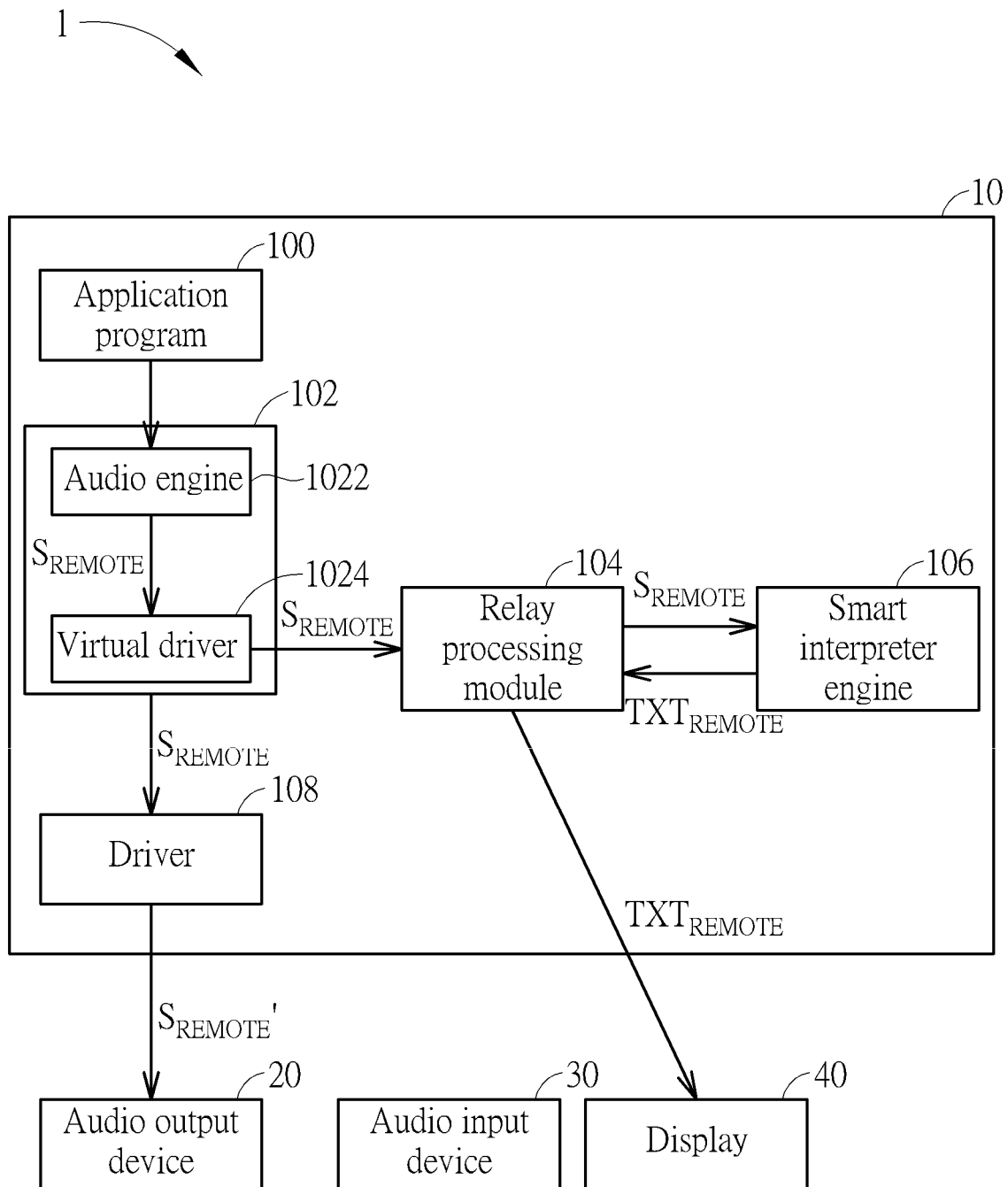
FIG. 5 is a schematic diagram of the electronic system operating in a first operation mode according to a second exemplary embodiment of the invention.

Please refer to FIG. 5. FIG. 5 is a schematic diagram of the electronic system 1 operating in a first operation mode (rendering mode) according to a second exemplary embodiment of the invention. As shown in FIG. 5, the audio processing module 102 includes an audio engine 1022 and a virtual driver 1024. For example, the audio engine 1022 can be an APO. In an embodiment, the audio engine 1022 can be a user mode component of an operating system. The virtual driver 1024 can be a kernel mode component of the operating system. The virtual driver 1024 can execute in the kernel mode. In the first operation mode (rendering mode), the audio engine 1022 can acquire at least one sound type of audio data from audio streams processed by the application program 100 for acting as audio data S$_{REMOTE}$ corresponding to a first language. The audio engine 1022 can utilize the APO to acquire required sound types of audio data. The audio engine 1022 merely acquires the required sound types of audio data from the audio streams without further processing the acquired audio data. Moreover, the virtual driver 1024 can intercept the audio data S$_{REMOTE}$, which is acquired by the audio engine 1022, corresponding to the first language. Further, the virtual driver 1024 transmits the audio data S$_{REMOTE}$ corresponding to the first language to the relay processing module 104 and the driver 108. That is, the virtual driver 1024 can intercept the audio data S$_{REMOTE}$ corresponding to the first language from the audio engine 1022 and transmits the intercepted audio data S$_{REMOTE}$ remaining untouched or unchanged to the relay processing module 104 and the driver 108.

The relay processing module 104 transmits the audio data $S_{REMOTE}$ corresponding to the first language to the smart interpreter engine 106. The smart interpreter engine 106 converts the audio data $S_{REMOTE}$ corresponding to the first language into text data $TXT_{REMOTE}$ corresponding to a second language and provides the text data $TXT_{REMOTE}$ corresponding to the second language to the delay processing module 104. Further, the delay processing module 104 provides the text data $TXT_{REMOTE}$ corresponding to the second language to the display 40. The display 40 displays the text data $TXT_{REMOTE}$ corresponding to the second language for the user. In addition, since the audio data $S_{REMOTE}$ corresponding to the first language is a digital signal, the driver 108 converts the audio data $S_{REMOTE}$ corresponding to the first language into an analog speech signal $S_{REMOTE'}$ corresponding to the first language. The analog speech signal $S_{REMOTE'}$ corresponding to the first language is an analog signal. For example, the driver 108 includes a digital to analog converter (not shown in figures). The digital to analog converter can convert the audio data $S_{REMOTE}$ corresponding to the first language into an analog speech signal $S_{REMOTE'}$ corresponding to the first language. The driver 108 transmits the analog speech signal $S_{REMOTE'}$ corresponding to the first language to the audio output device 20. The audio output device 20 playbacks the analog speech signal $S_{REMOTE'}$ corresponding to the first language to generate sound to the user. In other words, when a user familiar with the second language is using the electronic system 1, the user can hear the analog speech signal $S_{REMOTE'}$ corresponding to the first language played by the audio output device 20 and see the text data $TXT_{REMOTE}$ corresponding to the second language displayed by the display 40. Under such a situation, even the user does not understand the analog speech signal $S_{REMOTE'}$ corresponding to the first language, the user can understand and perceive what the information conveyed by the audio data $S_{REMOTE}$ corresponding to the first language while seeing the text data $TXT_{REMOTE}$ corresponding to the second language displayed by the display 40.

Figure 6:
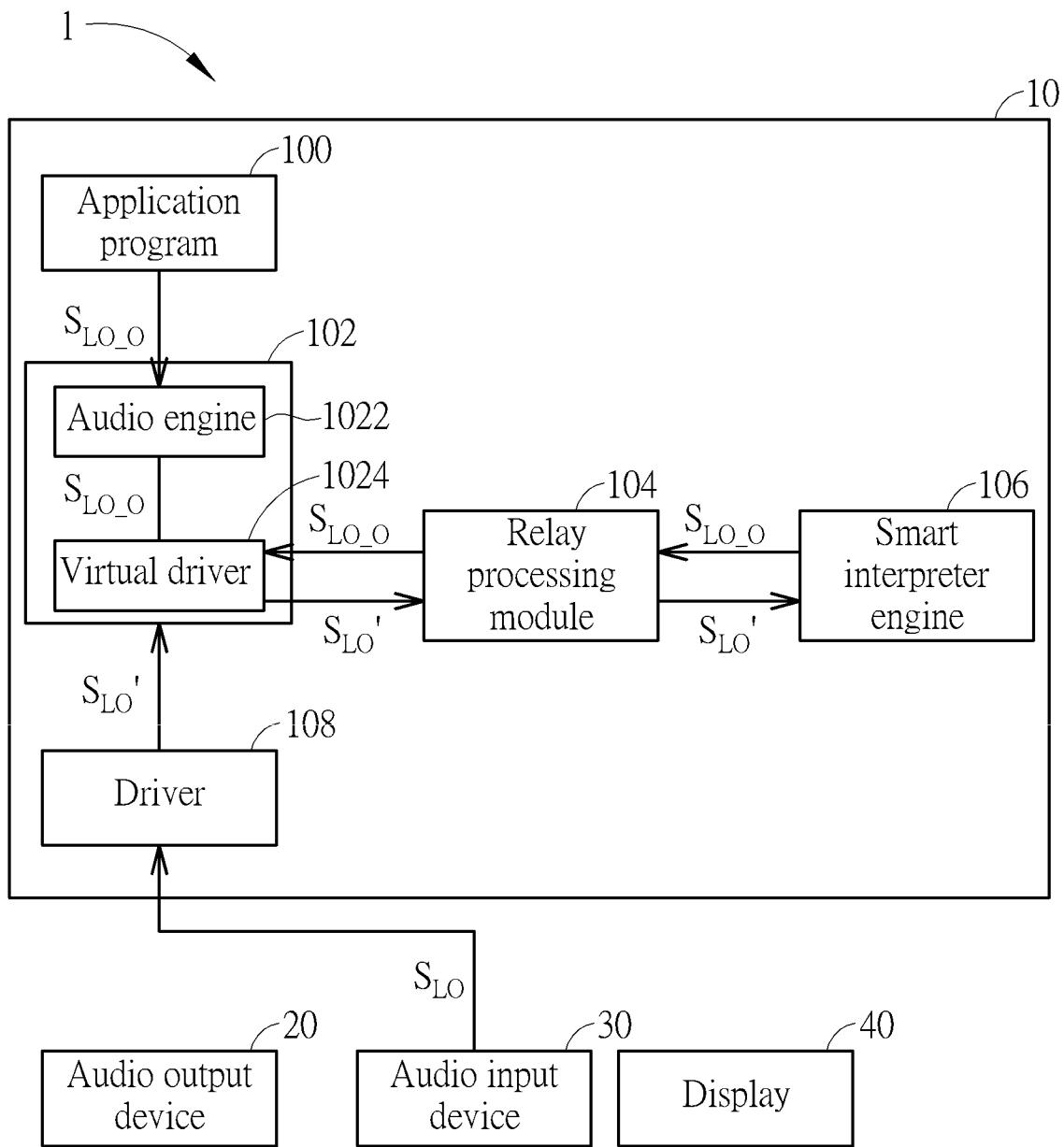
FIG. 6 is a schematic diagram of the electronic system operating in a second operation mode according to a second exemplary embodiment of the invention.

Please refer to FIG. 6. FIG. 6 is a schematic diagram of the electronic system 1 operating in a second operation mode (capturing mode) according to a second exemplary embodiment of the invention. As shown in FIG. 6, the audio processing module 102 includes an audio engine 1022 and a virtual driver 1024. For example, the audio engine 1022 can be an APO. In an embodiment, the audio engine 1022 can be a user mode component of an operating system. The virtual driver 1024 can be a kernel mode component of the operating system. The virtual driver 1024 can execute in the kernel mode. In the second operation mode (capturing mode), the audio input device 30 acquires speech sounds of the current environment to generate an analog speech signal $S_{LO}$ corresponding to a first language. The audio input device 30 transmits the analog speech signal $S_{LO}$ corresponding to the first language to the driver 108. Since the analog speech signal $S_{LO}$ corresponding to the first language is an analog signal, the driver 108 converts the analog speech signal $S_{LO}$ corresponding to the first language into audio data $S_{LO'}$ corresponding to the first language. The audio data $S_{LO'}$ corresponding to the first language is a digital signal. For example, the driver 108 includes an analog to digital converter (not shown in figures). The analog to digital converter can convert the analog speech signal $S_{LO}$ corresponding to the first language into the audio data $S_{LO'}$ corresponding to the first language. After that, the virtual driver 1024 can intercept the audio data $S_{LO'}$ converted by the driver 108 and corresponding to the first language. The virtual driver 1024 transmits the audio data $S_{LO'}$ remaining untouched or unchanged to the relay processing module 104. For example, the user can develop and create a virtual driver 1024 on the platform of the operating system (e.g., Microsoft Windows 10 operating system) and the virtual driver 1024 may be set to work within a driver layer. The virtual driver 1024 utilizes a software to simulate a hardware (e.g., audio input device 30) for replacing the original software, such that when intercepting the audio data $S_{LO'}$ corresponding to the first language, which is converted by the driver 108, the virtual driver 1024 can transmit the audio data $S_{LO'}$ remaining untouched to the relay processing module 104.

The relay processing module 104 transmits the audio data $S_{LO'}$ corresponding to the first language to the smart interpreter engine 106. The smart interpreter engine 106 converts the audio data $S_{LO'}$ corresponding to the first language into audio data $S_{LO\_O}$ corresponding to a second language. The smart interpreter engine 106 transmits the audio data $S_{LO\_O}$ corresponding to the second language to the relay processing module 104. The relay processing module 104 transmits the audio data $S_{LO\_O}$ corresponding to the second language to the virtual driver 1024. The virtual driver 1024 transmits the audio data $S_{LO\_O}$ (remaining untouched or unchanged) corresponding to the second language to the audio engine 1022. The audio engine 1022 provides the audio data $S_{LO\_O}$ corresponding to the second language to the application program 100. The application program 100 provides the audio data $S_{LO\_O}$ corresponding to the second language to the external device. As a result, when a user familiar with the second language is using the external device, the user can understand and perceive the information conveyed by the user of the electronic system 1 when hearing the audio data $S_{LO\_O}$ corresponding to the second language outputted by the electronic system 1.

Figure 7:
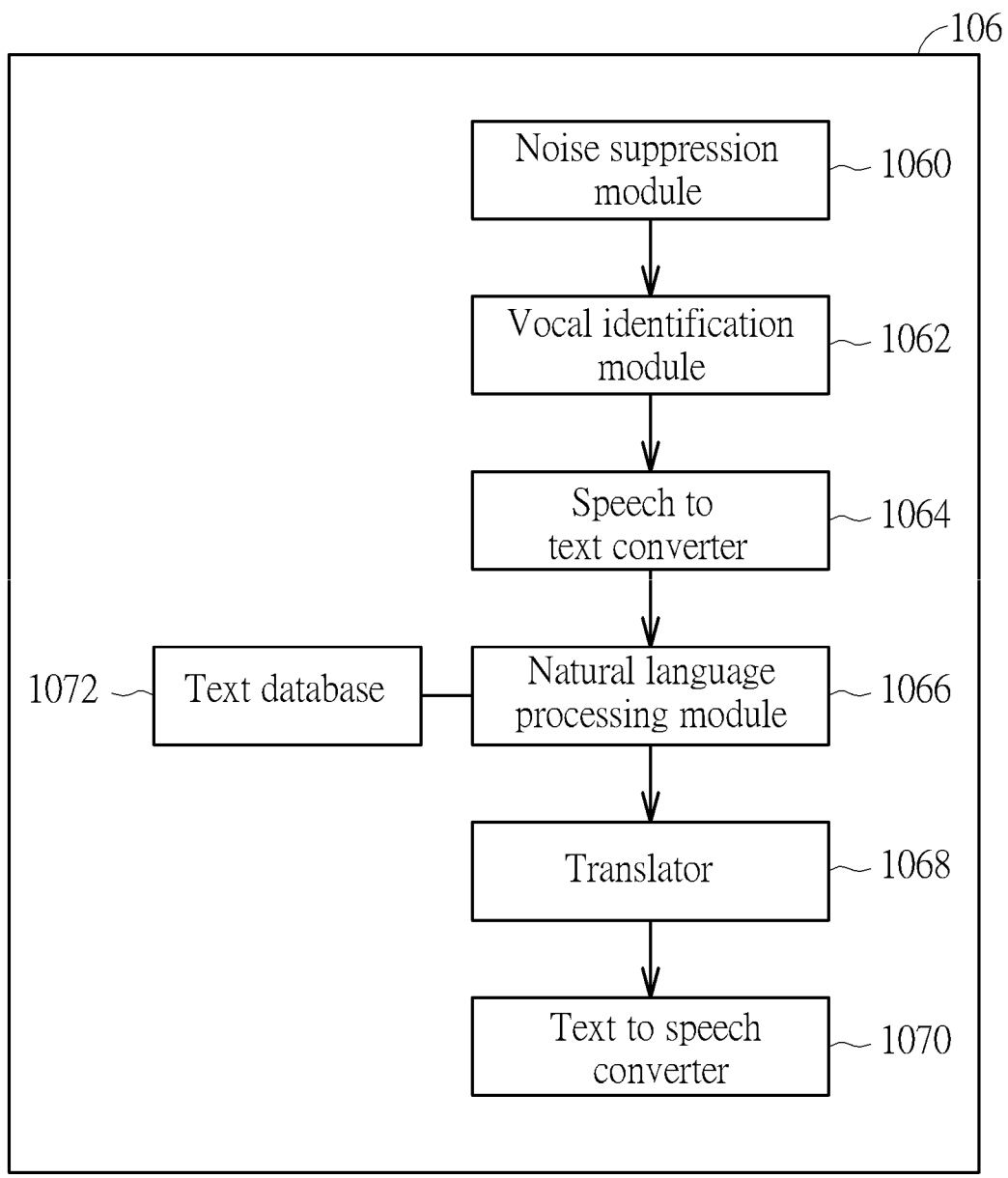
FIG. 7 is a schematic diagram of the smart interpreter engine shown in FIG. 1 according to a second exemplary embodiment of the invention.

Please refer to FIG. 7. FIG. 7 is a schematic diagram of the smart interpreter engine 106 shown in FIG. 1 according to an exemplary embodiment of the invention. The smart interpreter engine 106 includes a noise suppression module 1060, a vocal identification module 1062, a speech to text converter 1064, a natural language processing (NLP) module 1066, a translator 1068, a text to speech converter 1070 and a text database 1072. When the electronic system 1 operates in the first operation mode (capturing mode), the audio processing module 102 transmits the audio data $S_{REMOTE}$ corresponding to the first language to the relay processing module 104. The relay processing module 104 transmits the audio data $S_{REMOTE}$ corresponding to the first language to the smart interpreter engine 106. The noise suppression module 1060 performs a noise suppression process on the audio data $S_{REMOTE}$ corresponding to the first language for reducing noise component in the audio data. The vocal identification module 1062 performs a vocal identification process on the noise-suppressed audio data $S_{REMOTE}$ corresponding to the first language to generate vocal identification data corresponding to the first language. The vocal identification data is vocal data in the noise-suppressed audio data $S_{REMOTE}$, which is determined as a human voice by the vocal identification module 1062. In addition, if there is no noise suppression requirement, the smart interpreter engine 106 can directly transmit the noise-suppressed audio data $S_{REMOTE}$ to the vocal identification module 1062 for vocal identification processing. The speech to text converter 1064 converts the vocal identification data corresponding to the first language into text data corresponding to the first language. The text data corresponding to the first language may include at least one word.

The NLP module 1066 can convert the text data corresponding to the first language into glossary text data corresponding to the first language. For example, the NLP module 1066 converts the text data corresponding to the first language into glossary text data corresponding to the first language according to the application program 100 being executed in the host 10. The host 10 can inform the smart interpreter engine 106 of information of the application program 100 being executed in the host 10. Besides, the smart interpreter engine 106 can ask the host 10 which application program 100 is executing by the host 10. For example, the NLP module 1066 queries the text database 1072 according to the application program 100 being executed in the host 10 and the text data corresponding to the first language converted by the speech to text converter 1064. The text database 1072 includes a plurality of text samples corresponding to the first language and a plurality of application programs, and a plurality of glossary texts corresponding to the text samples. For example, a first text sample corresponding to the first language and a first application program has corresponding glossary text corresponding to the first language. A second text sample corresponding to the first language and a second application program has corresponding glossary text corresponding to the first language and so on. Each text sample includes at least one word. Each glossary text includes at least one word. As such, the NLP module 1066 can compare the application program 100 being executed in the host 10 and the text data corresponding to the first language with the text samples of the text database 1072, so as to find out the match results and accordingly determine the corresponding glossary text.

When a word of the text data corresponding to the first language matches a first text sample of the plurality of text samples of the text database 1072 and the application program 100 being executed in the host 10 matches an application program corresponding to the first text sample, the NLP module 1066 converts the word of the text data corresponding to the first language into the glossary text corresponding to the first text sample. When a plurality of words of the text data corresponding to the first language matches a first text sample of the plurality of text samples of the text database 1072 and the application program 100 being executed in the host 10 matches an application program corresponding to the first text sample, the NLP module 1066 converts the plurality of words of the text data corresponding to the first language into the glossary text corresponding to the first text sample. Moreover, the translator 1068 converts the glossary text data corresponding to the first language into text data $TXT_{REMOTE}$ corresponding to a second language. As a result the text data $TXT_{REMOTE}$ corresponding to a second language can be provided to the display 40 for display to the user.

For example, please refer to Table 2. Table 2 illustrates an exemplary embodiment of the text database 1062. Suppose the first language is English and the second language is Chinese. The first application program is League of Legends game software. The second application program is Minecraft game software. The third application program is SimCity game software. The fourth application program is general application program. For example, in this embodiment, the fourth application program can be any application program except the fifth application program. The glossary text corresponding to the fourth application program may be a daily life expression, rather than a glossary text dedicated to a component, a prop or a role in a specific game software. The fifth application program is PUBG (PLAYER UNKNOWN'S BATTLE GROUNDS) game software. If an English word in the text data is "flash" and the application program 100 being executed in the host 10 is the first application program, the NLP module 1066 converts the English word "flash" into a glossary text "flash" of English corresponding to the first application program. The translator 1068 converts the glossary text "flash" of English into Chinese words "閃現" (Chinese characters). If an English word in the text data is "flash" and the application program 100 being executed in the host 10 is the second application program, the NLP module 1066 converts the English word "flash" into a glossary text "accelerator" of English corresponding to the second application program. The translator 1068 converts the glossary text "accelerator" of English into Chinese words "加速器" (Chinese characters). In other words, each application program may apply different glossary texts (i.e. different glossary texts for different application programs). The user can choose different text database (also called language pack) for the smart interpreter engine 106. The smart interpreter engine 106 can also detect the kind of application program being executed and accordingly switch to the corresponding text database for interpretation. If an English word in the text data is "feeder" and the application program 100 being executed in the host 10 is the first application program, the NLP module 1066 converts the English word "feeder" into a glossary text "fertilizer" of English corresponding to the first application program. The translator 1068 converts the glossary text "fertilizer" of English into Chinese words "肥料" (Chinese characters). If an English word in the text data is "feeder" and the application program 100 being executed in the host 10 is the third application program, the NLP module 1066 converts the English feeder "flash" into a glossary text "feeder" of English corresponding to the third application program. The translator 1068 converts the glossary text "feeder" of English into Chinese words "餵養者" (Chinese characters) and the like.

TABLE 2

| text data corresponding to first language | application program | glossary text corresponding to first language | meanings of glossary text corresponding to first language | text corresponding to second language after translated |
|---|---|---|---|---|
| Flash | first application program | Flash | a skill from Summoner that quick moves from A place to B place | 閃現 ("shan hsien" in Romanized form) |

TABLE 2-continued

| text data corresponding to first language | application program | glossary text corresponding to first language | meanings of glossary text corresponding to first language | text corresponding to second language after translated |
|---|---|---|---|---|
| | second application program | Accelerator | an accelerator for character motion | 加速器 ("chia su chi" in Romanized form) |
| Feeder | first application program | Fertilizer | the player control a NPC always play quick dead | 肥料 ("fei liao" in Romanized form) |
| | third application program | Feeder | the man in the farm and job is feeding livestock | 飼養者 ("wei yang che" in Romanized form) |
| Chicken Dinner | fourth application program | Eat chicken | cooked chicken and be the dinner | 吃雞 ("chih chi" in Romanized form) |
| | fifth application program | Win | "WINER, WINER, CHICKEN DINNER" means the won side of the battle or play game | 勝利 ("sheng li" in Romanized form) |

Figure 8:
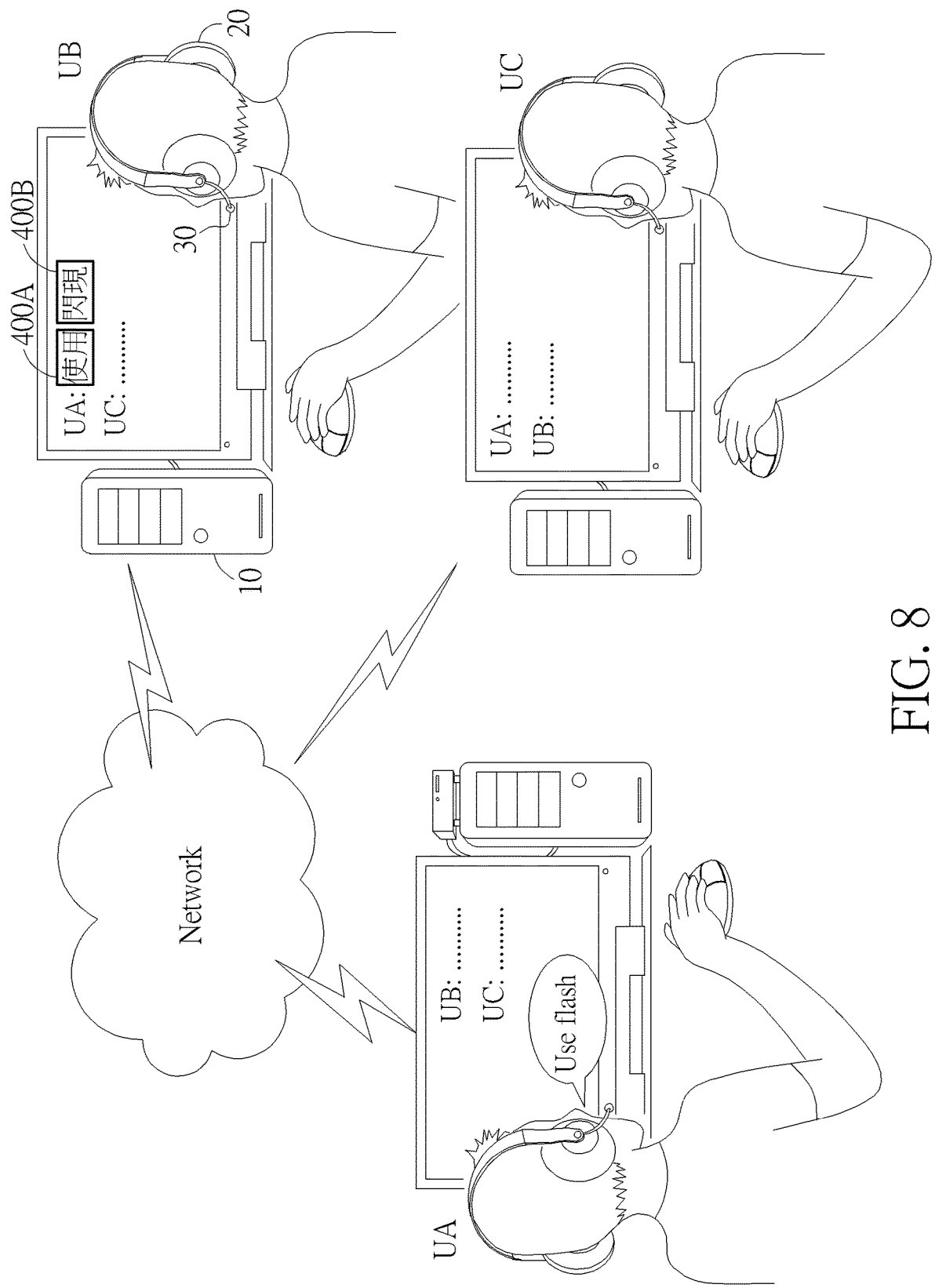
FIGS. 8-10 are schematic diagrams of the electronic system applied for an online game according to exemplary embodiments of the invention respectively.

Please refer to FIG. 8. FIG. 8 is a schematic diagram of the electronic system 1 applied for an online game according to an exemplary embodiment of the invention. The user UA can speak English, and can hear and understand English. The user UB can speak Chinese, and can hear and understand Chinese. The user UC can speak German, and can hear and understand German. As shown in FIG. 8, the users UA, UB and UC are utilizing their electronic systems to implement the first application program (e.g., League of Legends game software) for playing League of Legends online game, respectively. For example, the user UB utilizes the electronic system 1 of the invention to implement the first application program. When playing the League of Legends online game, the user UA says "use flash" in English and the corresponding analog speech signal of English is generated and transmitted to the electronic system 1 utilized by the user UB through the network. The electronic system 1 utilized by the user UB converts the analog speech signal of English in to audio data $S_{REMOTE}$ (digital data) of English. Since the host 10 is currently implementing the first application program, the smart interpreter engine 106 converts the audio data "flash" of English into Chinese words "閃現" (Chinese characters) after querying the text database 1072. Moreover, the smart interpreter engine 106 converts the audio data "use" of English into Chinese words "使用" (Chinese characters) after querying the text database 1072. Therefore, as shown in FIG. 8, the user UB can hear the spoken words "use flash" in English played by the audio output device 20 based on the analog speech data $S_{REMOTE'}$. A display area 400A of the display 40 shows the Chinese words "使用" in Chinese characters. A display area 400B of the display 40 shows the Chinese words "閃現" in Chinese characters. As a result, although the user UB does not understand English and does hear the analog speech data $S_{REMOTE'}$ (i.e. the spoken words "use flash") of English played by the audio output device 20, the user UB can still understand and perceive what the information conveyed by the user UA while seeing the Chinese words "使用閃現" in Chinese characters displayed on the display 40. Therefore, the electronic system 1 can not only convert the speech data into text data, but also provide flexible glossary translation for different application situations, so as to meet player's demands and increase player immersion in the esports game.

Figure 9:
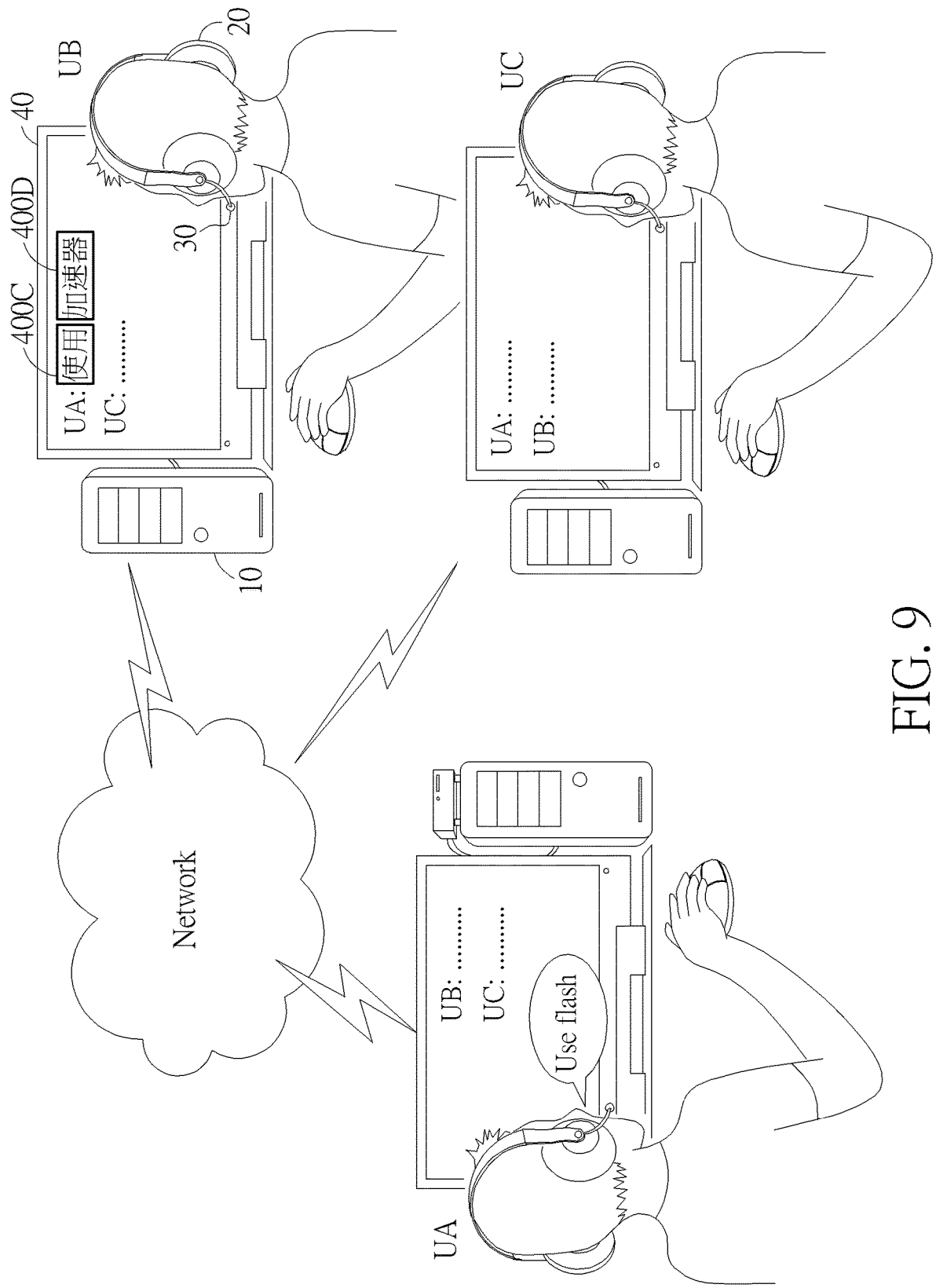

Please refer to FIG. 9. FIG. 9 is a schematic diagram of the electronic system 1 applied for an online game according to an alternative exemplary embodiment of the invention. The user UA can speak English, and can hear and understand English. The user UB can speak Chinese, and can hear and understand Chinese. The user UC can speak German, and can hear and understand German. As shown in FIG. 9, the users UA, UB and UC are utilizing their electronic systems to implement the second application program (e.g., Minecraft game software) for playing Minecraft online game, respectively. For example, the user UB utilizes the electronic system 1 of the invention to implement the second application program. When playing the Minecraft online game, the user UA says "use flash" in English and the corresponding analog speech signal of English is generated and transmitted to the electronic system 1 utilized by the user UB through the network. The electronic system 1 utilized by the user UB converts the analog speech signal of English in to audio data $S_{REMOTE}$ (digital data) of English. Since the host 10 is currently implementing the second application program, the smart interpreter engine 106 converts the audio data "flash" of English into Chinese words "加速器" (Chinese characters) after querying the text database 1072. Moreover, the smart interpreter engine 106 converts the speech data "use" of English into Chinese words "使用" (Chinese characters) after querying the text database 1072. Therefore, as shown in FIG. 9, the user UB can hear the spoken words "use flash" in English played by the audio output device 20 based on the analog speech data $S_{REMOTE'}$. A display area 400C of the display 40 shows Chinese words "使用" in Chinese characters. A display area 400D of the display 40 shows Chinese words "加速器" in Chinese characters. As a result, although the user UB does not understand English and does hear the analog speech data $S_{REMOTE'}$ (i.e. the spoken words "use flash") of English played by the audio output device 20, the user UB can still understand and perceive what the information conveyed by the user UA while seeing the Chinese words "使用加速器" in Chinese characters displayed on the display 40.

Please further refer to FIGS. 4 and 6-7. When the electronic system 1 operates in the second operation mode (capturing mode), the driver 108 converts the analog speech signal $S_{LO}$ corresponding to the first language into audio data $S_{LO'}$ corresponding to the first language and transmits the audio data $S_{LO'}$ corresponding to the first language to the audio processing module 102. The audio processing module 102 transmits the audio data $S_{LO'}$ corresponding to the first language to the relay processing module 104. After that, the relay processing module 104 transmits the audio data $S_{LO'}$ corresponding to the first language to the smart interpreter engine 106. Further, the noise suppression module 1060 performs a noise suppression process on the audio data $S_{LO'}$ corresponding to the first language for reducing noise component in the audio data. The vocal identification module 1062 performs a vocal identification process on the noise-suppressed audio data $S_{LO'}$ corresponding to the first language to generate vocal identification data corresponding to the first language. The speech to text converter 1064 converts the vocal identification data corresponding to the first language into text data corresponding to the first language. As mentioned above, The NLP module 1066 can convert the text data corresponding to the first language into glossary text data corresponding to the first language. The translator 1068 converts the glossary text data corresponding to the first language into text data corresponding to a second language. Moreover, the text to speech converter 1070 converts the text data corresponding to the second language into the audio data $S_{LO\_O}$ corresponding to the second language. After that, the smart interpreter engine 106 transmits the audio data $S_{LO\_O}$ corresponding to the second language to the relay processing module 104. The relay processing module 104 transmits the audio data $S_{LO\_O}$ corresponding to the second language to the audio processing module 102. The audio processing module 102 transmits the audio data $S_{LO\_O}$ corresponding to the second language to the application program 100. The application program 100 provides the audio data $S_{LO\_O}$ corresponding to the second language to the external devices. Under such a situation, when a user familiar with the second language is using the external device, the user can understand and perceive the information conveyed by the user of the electronic system 1 after hearing the audio data $S_{LO\_O}$ corresponding to the second language outputted by the electronic system 1.

Figure 10:
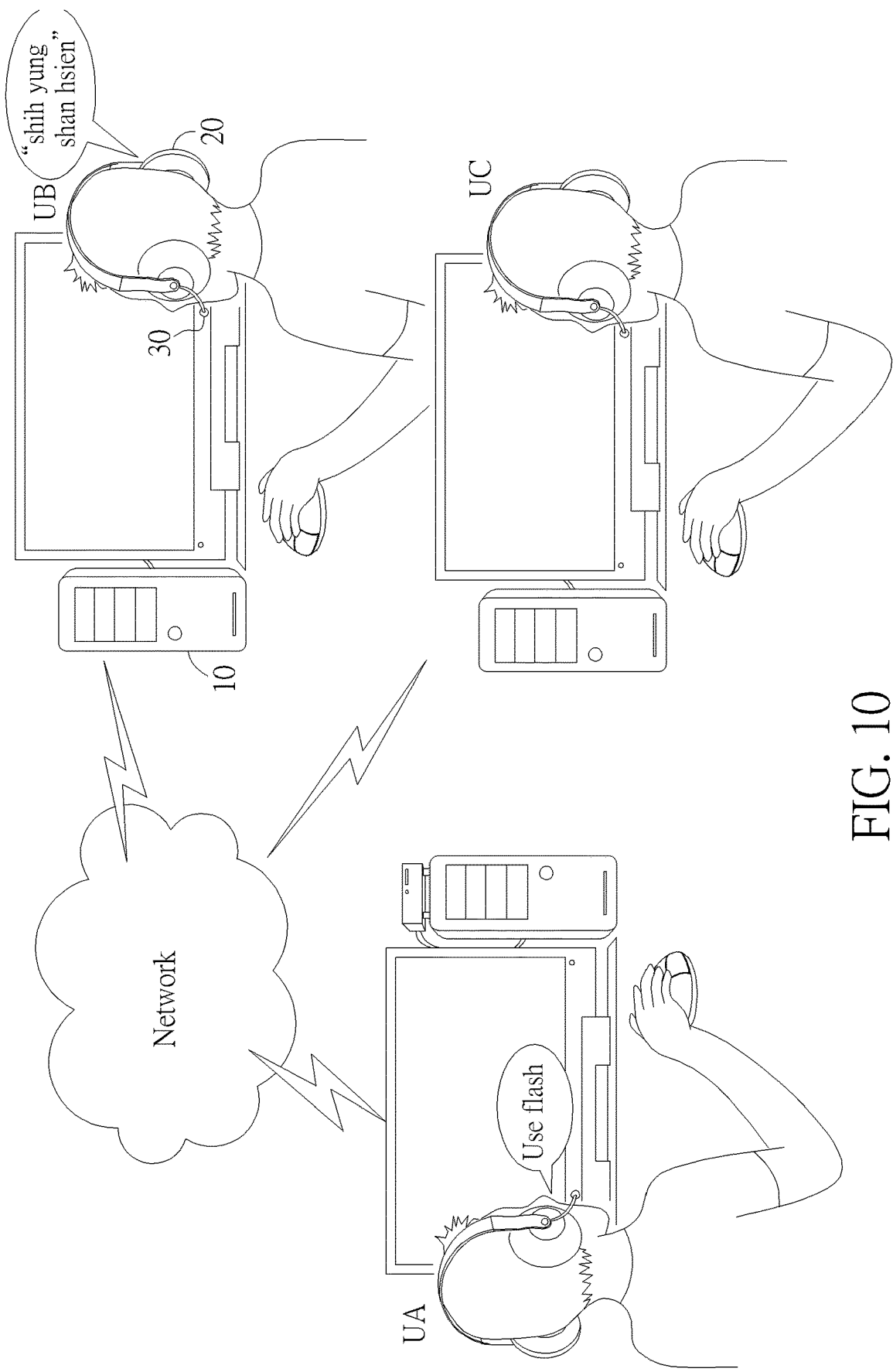

Please refer to FIG. 10. FIG. 10 is a schematic diagram of the electronic system 1 applied for an online game according to an alternative exemplary embodiment of the invention. The user UA can speak English, and can hear and understand English. The user UB can speak Chinese, and can hear and understand Chinese. The user UC can speak German, and can hear and understand German. As shown in FIG. 10, the users UA, UB and UC are utilizing their electronic systems to implement the first application program (e.g., League of Legends game software) for playing League of Legends online game, respectively. For example, the user UA utilizes the electronic system 1 of the invention to implement the first application program. When playing the League of Legends online game, the user UA says "use flash" in English and the corresponding analog speech signal of English is generated. The driver 108 of the electronic system 1 utilized by the user UA converts the analog speech signal of English into digital audio data of English. Since the host 10 is currently implementing the first application program, the smart interpreter engine 106 converts the audio data "use flash" of English into audio data "使用閃現" (i.e. "shih yung shan hsien" in Romanized form) of Chinese and provides the converted audio data of Chinese to the user UB. As a result, the user UB can understand and perceive what the information conveyed by the user UA while hearing the speech data "使用閃現" (i.e. "shih yung shan hsien" in Romanized form) of Chinese.

In summary, the embodiments of the invention provide the user utilizing the electronic system 1 to hear the analog speech data corresponding to the first language played by the audio output device 20 and see the text data displayed by the display 40. Under such a situation, even the user does not understand the analog speech data corresponding to the first language, the user can understand and perceive what the information conveyed by the speech data corresponding to the first language while seeing the text data corresponding to the second language displayed by the display 40. Besides, the embodiments of the invention can convert the analog speech data inputted by the user corresponding to the first language into audio data corresponding to a second language, so as to allow other user can understand what the user utilizing the electronic system 1 conveys. Moreover, the embodiments of the invention can acquire audio data in game and submit audio data to a smart interpreter engine for vocal identification and neural machine translation so as to facilitate the user to easy understand what the other user conveys. As such, the embodiments of the invention can bring good interaction between users using different languages and effectively improve the user experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic system, comprising:
    a host, comprising:
        an audio processing module for acquiring audio data corresponding to a first language from audio streams processed by an application program executed on the host, wherein the application program executed on the host comprises a specific game software;
        a relay processing module, for receiving the audio data corresponding to the first language from the audio processing module;
        a smart interpreter engine for receiving the audio data corresponding to the first language from the relay processing module and converting the audio data corresponding to the first language into text data corresponding to a second language according to the game software executed on the host, wherein the smart interpreter engine transmits the text data corresponding to the second language to the relay processing module; and
        a driver for converting the audio data corresponding to the first language into an analog speech signal corresponding to the first language;

an audio output device for playing the analog speech signal corresponding to the first language; and a display for receiving the text data corresponding to the second language from the relay processing module and displaying the text data corresponding to the second language.

2. The electronic system of claim 1, wherein the audio processing module comprises:

an audio engine for acquiring the audio data corresponding to the first language from the audio streams processed by the game software executed on the host and transmitting the audio data corresponding to the first language to the relay processing module.

3. The electronic system of claim 1, wherein the audio processing module comprises:

an audio engine for acquiring the audio data corresponding to the first language from the audio streams processed by the game software executed on the host; and a virtual driver for intercepting the audio data acquired by the audio engine and corresponding to the first language and transmitting the intercepted audio data corresponding to the first language to the relay processing module.

4. The electronic system of claim 1, wherein the smart interpreter engine converts the audio data corresponding to the first language into text data corresponding to the first language, and the smart interpreter engine comprises:

a natural language processing module for converting the text data corresponding to the first language into glossary text data corresponding to the first language according to the game software executed by the host; and a translator for converting the glossary text data corresponding to the first language into text data corresponding to the second language.

5. The electronic system of claim 1, wherein the smart interpreter engine is disposed in a cloud server.

6. A multimedia processing method, for an electronic system, the electronic system comprising a host, the host comprising an audio processing module, a relay processing module, a smart interpreter engine and a driver, the multimedia processing method comprising:

utilizing the audio processing module to acquire audio data corresponding to a first language from audio streams processed by an application program executed on the host and transmitting the audio data corresponding to the first language to the relay processing module and the driver, wherein the application program executed on the host comprises a specific game software;

utilizing the relay processing module to transmit the audio data corresponding to the first language to the smart interpreter engine;

utilizing the smart interpreter engine to convert the audio data corresponding to the first language into text data corresponding to a second language according to the game software being executed on the host and transmit the text data corresponding to the second language to the relay processing module;

utilizing the relay processing module to transmit the text data corresponding to the second language to a display of the electronic system for displaying; and utilizing the driver to convert the audio data corresponding to the first language into an analog speech signal corresponding to the first language and output the analog speech signal corresponding to the first language to an audio output device of the electronic system for playing.

7. The multimedia processing method of claim 6, wherein the audio processing module comprises an audio engine, the audio engine acquires the audio data corresponding to the first language from the audio streams processed by the game software executed on the host and transmits the audio data corresponding to the first language to the relay processing module.

8. The multimedia processing method of claim 6, wherein the audio processing module comprises an audio engine and a virtual driver, the audio engine acquires the audio data corresponding to the first language from the audio streams processed by the game software executed on the host, and the virtual driver intercepts the audio data acquired by the audio engine and corresponding to the first language and transmits the intercepted audio data corresponding to the first language to the relay processing module.

9. The multimedia processing method of claim 6, wherein the smart interpreter engine converts the audio data corresponding to the first language into text data corresponding to the first language, converts the text data corresponding to the first language into glossary text data corresponding to the first language according to the game software executed by the host, and converts the glossary text data corresponding to the first language into text data corresponding to the second language.

10. The multimedia processing method of claim 6, wherein the smart interpreter engine is disposed in a cloud server.

11. An electronic system, comprising:

an audio input device for acquiring speech sounds of current environment to generate an analog speech signal corresponding to a first language; and a host, comprising:

a driver for receiving the analog speech signal corresponding to the first language from the audio input device and converting the analog speech signal corresponding to the first language into audio data corresponding to the first language;

an audio processing module for obtaining the audio data corresponding to the first language from the driver;

a relay processing module for receiving the audio data corresponding to the first language from the audio processing module; and a smart interpreter engine for receiving the audio data corresponding to the first language from the relay processing module and converting the audio data corresponding to the first language into audio data corresponding to a second language according to an application program executed in the host, wherein the application program executed on the host comprises a specific game software;

wherein the relay processing module receives the audio data corresponding to the second language from the smart interpreter engine and transmits the audio data corresponding to the second language to the audio processing module, and the audio processing module transmits the audio data corresponding to the second language to the application program executed by the host.

12. The electronic system of claim 11, wherein the audio processing module comprises an audio engine, the audio engine receives the audio data corresponding to the first language from the driver and transmits the audio data corresponding to the first language to the relay processing module, and the audio engine receives the audio data corresponding to the second language from the relay processing module and transmits the audio data corresponding to the second language to the game software executed by the host.

13. The electronic system of claim 11, wherein the audio processing module comprises a virtual driver and an audio engine, the virtual driver intercepts the audio data corresponding to the first language from the driver, transmits the audio data corresponding to the first language to the relay processing module and receives the audio data corresponding to the second language from the relay processing module, and the audio engine receives the audio data corresponding to the second language from the virtual driver and provides the audio data corresponding to the second language to the game software executed by the host.

14. The electronic system of claim 11, wherein the smart interpreter engine converts the audio data corresponding to the first language into text data corresponding to the first language, and the smart interpreter engine comprises:
   a natural language processing module for converting the text data corresponding to the first language into glossary text data corresponding to the first language according to the game software executed by the host;
   a translator for converting the glossary text data corresponding to the first language into text data corresponding to the second language; and
   a text to speech converter for converting the text data corresponding to the second language into the audio data corresponding to the second language.

15. The electronic system of claim 11, wherein the smart interpreter engine is disposed in a cloud server.

16. A multimedia processing method, for an electronic system, the electronic system comprising an audio input device and a host, the host comprising an audio processing module, a relay processing module, a smart interpreter engine and a driver, the multimedia processing method comprising:
   utilizing the audio input device to acquire speech sounds of current environment to generate an analog speech signal corresponding to a first language;
   utilizing the driver to receive the analog speech signal corresponding to the first language from the audio input device and convert the analog speech signal corresponding to the first language into audio data corresponding to the first language;
   utilizing the audio processing module to obtain the audio data corresponding to the first language from the driver and transmit the audio data corresponding to the first language to the relay processing module;
   utilizing the relay processing module to transmit the audio data corresponding to the first language to the smart interpreter engine;
   utilizing the smart interpreter engine to convert the audio data corresponding to the first language into audio data corresponding to a second language according to an application program executed in the host, wherein the application program executed on the host comprises a specific game software, and transmit the audio data corresponding to the second language to the relay processing module;
   utilizing the relay processing module to transmit the audio data corresponding to the second language to the audio processing module; and
   utilizing the audio processing module to transmit the audio data corresponding to the second language to the application program executed by the host.

17. The multimedia processing method of claim 16, wherein the audio processing module comprises an audio engine, the audio engine receives the audio data corresponding to the first language from the driver and transmits the audio data corresponding to the first language to the relay processing module, and the audio engine receives the audio data corresponding to the second language from the relay processing module and transmits the audio data corresponding to the second language to the game software executed by the host.

18. The multimedia processing method of claim 16, wherein the audio processing module comprises a virtual driver and an audio engine, the virtual driver intercepts the audio data corresponding to the first language from the driver, transmits the audio data corresponding to the first language to the relay processing module and receives the audio data corresponding to the second language from the relay processing module, and the audio engine receives the audio data corresponding to the second language from the virtual driver and provides the audio data corresponding to the second language to the software executed by the host.

19. The multimedia processing method of claim 16, wherein the smart interpreter engine converts the audio data corresponding to the first language into text data corresponding to the first language, converts the text data corresponding to the first language into glossary text data corresponding to the first language according to the game software executed by the host, converts the glossary text data corresponding to the first language into text data corresponding to the second language and converts the text data corresponding to the second language into the audio data corresponding to the second language.

20. The multimedia processing method of claim 16, wherein the smart interpreter engine is disposed in a cloud server.

* * * * *